(12) United States Patent
Miura et al.

(10) Patent No.: US 6,954,854 B1
(45) Date of Patent: Oct. 11, 2005

(54) ELECTRONIC AUTHENTICATION METHOD, ELECTRONIC AUTHENTICATION APPARATUS AND ELECTRONIC AUTHENTICATION STORAGE MEDIUM

(75) Inventors: Junichi Miura, Tokyo (JP); Yukio Saito, Tokyo (JP); Ryota Koiso, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 851 days.

(21) Appl. No.: 09/591,927

(22) Filed: Jun. 12, 2000

(30) Foreign Application Priority Data

Jun. 21, 1999 (JP) ................................. 11-174066

(51) Int. Cl.$^7$ ............................ H04L 9/00; G06F 17/60
(52) U.S. Cl. ...................... 713/168; 713/176; 713/202; 705/52; 705/59; 380/30; 380/278
(58) Field of Search ................................ 713/176–179, 713/193, 200–202, 150, 168, 171, 172, 182–185; 705/26, 50–59; 380/30, 28, 44, 277–279; 709/229; 340/5.1, 5.85, 5.86; 379/142.05

(56) References Cited

U.S. PATENT DOCUMENTS

| 5,732,137 | A | | 3/1998 | Aziz | |
|---|---|---|---|---|---|
| 6,044,471 | A | * | 3/2000 | Colvin | 713/202 |
| 6,092,196 | A | * | 7/2000 | Reiche | 713/200 |
| 6,226,618 | B1 | * | 5/2001 | Downs et al. | 705/1 |
| 6,237,095 | B1 | * | 5/2001 | Curry et al. | 713/178 |
| 6,367,012 | B1 | * | 4/2002 | Atkinson et al. | 713/176 |
| 6,418,472 | B1 | * | 7/2002 | Mi et al. | 709/229 |
| 6,446,211 | B1 | * | 9/2002 | Colvin | 713/202 |
| 6,460,142 | B1 | * | 10/2002 | Colvin | 713/202 |
| 6,484,264 | B1 | * | 11/2002 | Colvin | 713/202 |
| 6,502,195 | B1 | * | 12/2002 | Colvin | 713/202 |
| 6,519,701 | B1 | * | 2/2003 | Kawamura et al. | 713/201 |
| 6,587,837 | B1 | * | 7/2003 | Spagna et al. | 705/26 |
| 6,785,825 | B2 | * | 8/2004 | Colvin | 713/202 |
| 6,792,548 | B2 | * | 9/2004 | Colvin | 713/202 |
| 6,792,549 | B2 | * | 9/2004 | Colvin | 713/202 |
| 6,795,925 | B2 | * | 9/2004 | Colvin | 713/202 |
| 6,799,277 | B2 | * | 9/2004 | Colvin | 713/202 |
| 6,813,717 | B2 | * | 11/2004 | Colvin | 713/202 |
| 6,813,718 | B2 | * | 11/2004 | Colvin | 713/202 |
| 6,857,078 | B2 | * | 2/2005 | Colvin | 713/202 |

FOREIGN PATENT DOCUMENTS

EP          0 749 078 A1     12/1996

* cited by examiner

*Primary Examiner*—Christopher Revak
(74) *Attorney, Agent, or Firm*—Townsend and Townsend and Crew LLP (57) ABSTRACT

According to the invention, techniques for verifying that data input as a response to presented contents is true input data for a content access. In a representative embodiment according to the present invention, there is provided an electronic authentication method that comprises a variety of steps, such as a step of generating an identifier for contents in a first information processing apparatus and storing the identifier in a storage unit. Transmitting the contents and the identifier to a second information processing apparatus can also be part of the method. Steps of inputting data for the contents in the second information processing apparatus and transmitting the input data and the identifier from the second information apparatus to the first information apparatus can also be included in the method. Further, the method can also include authenticating legitimacy of the input data and invalidating the stored identifier if the received identifier matches the identifier in the storage unit in the first information processing apparatus.

17 Claims, 4 Drawing Sheets

ELECTRONIC AUTHENTICATION METHOD, ELECTRONIC AUTHENTICATION APPARATUS AND ELECTRONIC AUTHENTICATION STORAGE MEDIUM

CROSS-REFERENCES TO RELATED APPLICATIONS

This application claims priority from Japanese Patent Application Reference No. 11-174066, filed Jun. 21, 1999.

BACKGROUND OF THE INVENTION

The present invention relates to a system for transmitting contents from an information processing apparatus rendering services to an information processing apparatus making a request for a service and transmitting input data for the contents from the latter information processing apparatus to the former information processing apparatus. More particularly, the present invention relates to an electronic authentication techniques for authenticating legitimacy of input data for a content access.

In the field of electronic business transactions using the Internet, security technologies such as authentication of a true person and prevention of data falsification have become increasingly important. As conventional security technologies, a variety of efforts have been made such as establishment of a password system, establishment of a variety of encryption systems for encrypting data and issuance of an electronic note of authentication.

What is really needed are techniques for verifying that the correct response data is provided responsive to an access request for contents in a system in which a server transmits the requested contents to a client requester and the client transmits input data to the server as the response data responsive to the contents.

SUMMARY OF THE INVENTION

According to the invention, techniques for verifying that data input as a response to presented contents is true input data for a content access are provided. In specific embodiments, the present invention can provide methods, systems and storage media that store a program, each of which implement electronic authentication techniques.

In a representative embodiment according to the present invention, there is provided an electronic authentication method that comprises a variety of steps, such as a step of generating an identifier for contents in a first information processing apparatus and storing the identifier in a storage unit. Transmitting the contents and the identifier to a second information processing apparatus can also be part of the method. Steps of inputting data for the contents in the second information processing apparatus and transmitting the input data and the identifier from the second information apparatus to the first information apparatus can also be included in the method. Further, the method can also include authenticating legitimacy of the input data and invalidating the stored identifier if the received identifier matches the identifier in the storage unit in the first information processing apparatus.

In addition, the present invention relates to a first information processing apparatus and a second information processing apparatus which are used for implementing the method described above. Furthermore, the present invention characterizes a storage medium for storing a program implementing the electronic authentication described above.

In a representative embodiment according to the present invention, a WWW server program generates an identifier for an access to contents and catalogs the identifier in an access control table. The WWW server program then embeds the identifier in the contents before transmitting the contents to a client. A WWW browser program displays the contents and adds an access number fetched from the contents to input data for the contents. The WWW browser program then transmits the input data to a WWW server. If the identifier added to the input data received from the WWW browser program matches an identifier cataloged in the access control table, the WWW server program authenticates the legitimacy of the input data and deletes the cataloged identifier.

Numerous benefits are achieved by way of the present invention over conventional techniques. The present invention can provide a method to verify that data input as a response to presented contents is true input data for a content access. The present invention can provide a storage medium for storing a program implementing such an electronic authentication method. When personal information, transaction data and the like are transmitted from the client 1 to the WWW server 2 in response to contents transmitted from the WWW server 2 to the client 1 in a transaction such as Internet shopping or an electronic business transaction using the Internet, the present invention allows the personal information, the transaction data and the like to be verified as input data for a legal access to the contents. In addition, the present invention is also capable of preventing double transaction data from being transmitted by issuing two or more orders for one order form by user's mistake.

These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

The present invention provides techniques for verifying that data input as a response to presented contents is true input data for a content access. In specific embodiments, the present invention can provide methods, systems and storage media that store a program, each of which implement electronic authentication techniques.

Techniques for authenticating a true person by an electronic signature include encrypting transmitted data by using a private key. With such techniques, however, it is often necessary to control the private key on the transmitter side. As a result, control can become complicated. In addition, in the case of authentication of a true person by using an ID or a password, the password may be transmitted through a network as a clear text, raising a problem of inability to prevent falsification of the identity of a true person by another illegally using a password intercepted during transmission. For a more detailed description of techniques for authenticating a person by an electronic signature used in encrypting transmitted data by using a private key, further reference may be had to a Japanese Patent Laid-open No. Hei 10-32570, the entire content of which is incorporated herein by reference for all purposes.

In systems using the Internet, a client generally transmits a request for contents to a WWW (World Wide Web) server. In response to this request, the WWW server transmits the requested contents to the client, which then displays the contents on a display unit. When the client inputs data for the contents and transmits the input data to the WWW server, the WWW server processes the data received from the client. The client is capable of copying the contents with ease. Thus, it is quite within the bounds of possibility that an illegal operation is carried out on copied contents. For example, a copy of the contents is extracted and reused, or another user falsifies data through a content screen and transmits the falsified data to the WWW server.

Embodiments according to the present invention that can overcome many such limitations of conventional methods will now be described by referring to diagrams as follows.

Figure 1:
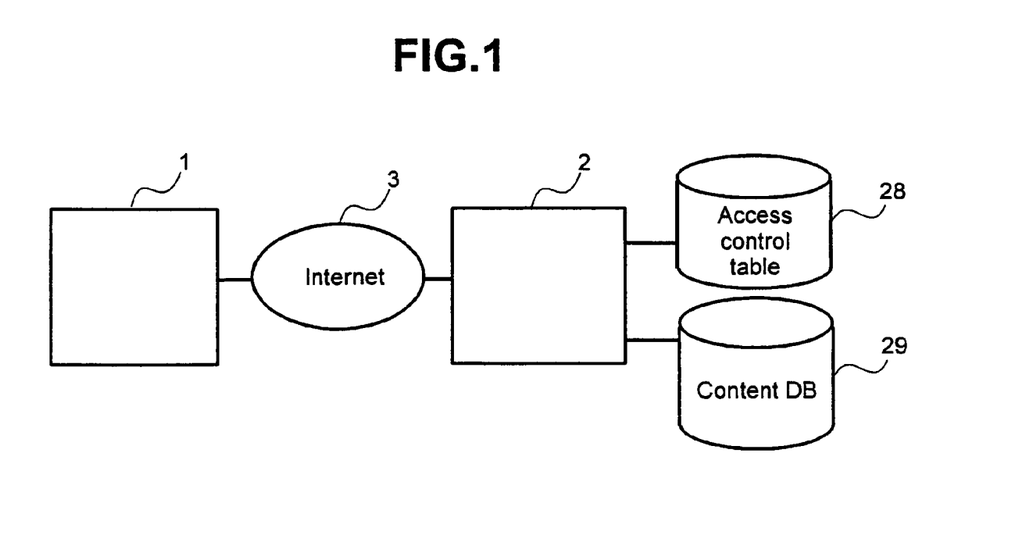
FIG. 1 illustrates a diagram showing the configuration of a system for rendering services by using the Internet as implemented by an embodiment of the present invention.
Figure 5:
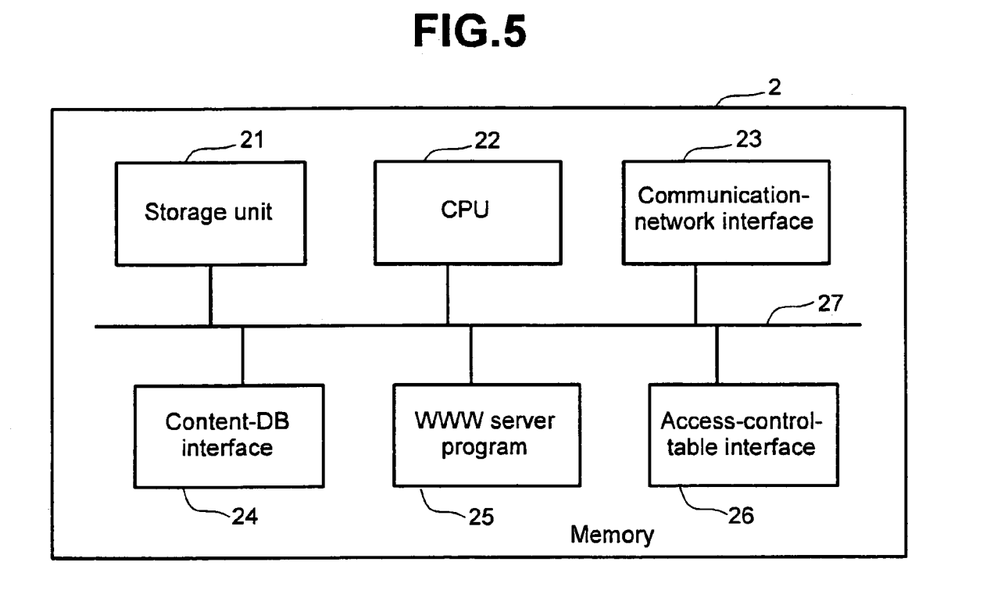
FIG. 5 illustrates a diagram showing the hardware configuration of a WWW server employed in a particular embodiment of the present invention.

FIG. 1 is a diagram showing the configuration of a system for rendering services by using the Internet as implemented by a specific embodiment. As shown in FIG. 1, the system comprises a client 1, a WWW server 2 and the Internet 3 which serves as a network connecting the client 1 and the WWW server 2 to each other. As shown in FIG. 5, the hardware configuration of the WWW server 2 comprises a storage unit 21, a central processing unit (CPU) 22, a communication-network interface 23, a content-DB interface 24, an access-control-table interface 26 and a temporary storage unit (memory) for storing a WWW server program 25 which are connected to each other by a bus 27.

Storage unit 21 is used for permanently storing programs and data used in the WWW server 2. The storage unit 21 is implemented typically by a hard disc and a floppy disc. The CPU 22 executes overall control of the components composing the WWW server 2 and carries out processing. The communication-network interface 23 is an interface for handling exchanges of data with the client 1 by way of the Internet 3. The content-DB interface 24 is an interface for handling exchanges of data with a content DB 29 of FIG. 1. The access-control-table interface 26 is an interface for handling exchanges of data with an access control table 28 of FIG. 1. The memory is used for storing a WWW server program 25 and other information which are required in the processing carried out by the CPU 22.

Figure 6:
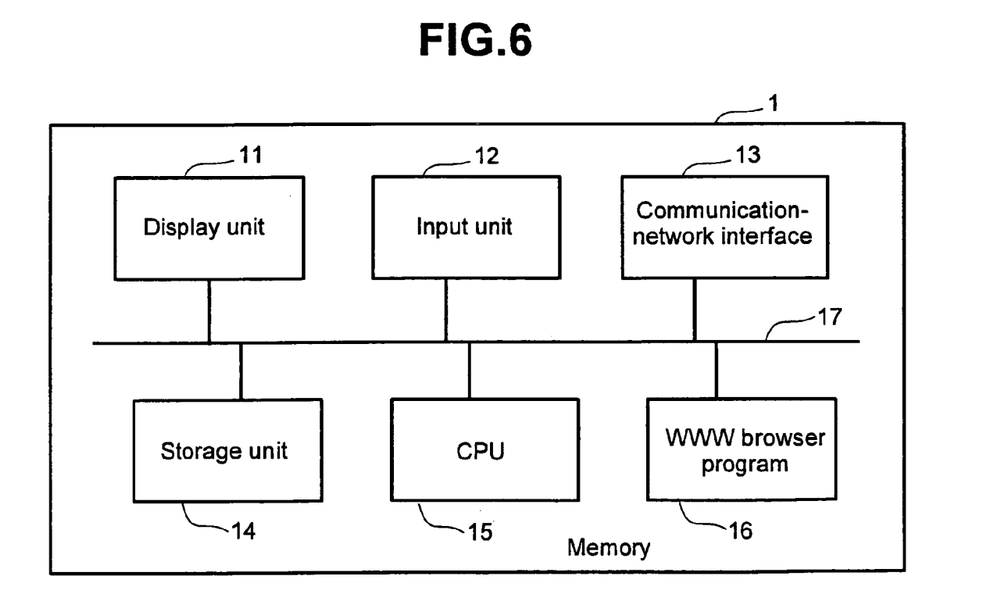
FIG. 6 illustrates a diagram showing the hardware configuration of a client employed in a particular embodiment of the present invention.

As shown in FIG. 6, the hardware configuration of the client 1 comprises a display unit 11, an input unit 12, a communication-network interface 13, a temporary storage unit (memory) for storing a WWW browser program 16, a central processing unit (CPU) 14 and a storage unit 15 which are connected to each other by a bus 17.

Display unit 11 is used for displaying a message and other information to the user utilizing the client 1. The display unit 11 is implemented typically by a liquid-crystal display device or a CRT. Input unit 12 is used by the user for entering data, an electronic message and other information, for example. The input unit 12 is implemented by components such as a keyboard and a mouse. The communication-network interface 13 is an interface for handling exchanges of data with the WWW server 2 by way of the Internet 3. Storage unit 15 is used for permanently storing programs and data used in the client 1. The storage unit 15 is implemented typically by a hard disc and a floppy disc. The CPU 14 executes overall control of the components comprising the client 1 and carries out processing. The memory is used for storing the WWW browser program 16 and other information which are required in the processing carried out by the CPU 14.

The WWW browser program 16 transmits a request for contents to the WWW server 2 by way of the Internet 3 and displays the contents received from the WWW server 2 on the display unit 11. In addition, the WWW browser program 16 also transmits data entered via the input unit 12 to the WWW server 2.

The WWW server 2 is a computer on the service rendering side. The storage unit connected to the processing unit is used for storing the access control table 28 and the content DB (data base) 29. The access control table 28 is used for storing authentication information for controlling accesses to contents. The content DB 29 is a DB for storing contents to be presented to the client 1. Contents are display screen information stored in the WWW server 2 to be presented to the client 1. Contents can include text data, image data, a still picture or a moving picture. The WWW server program 25 is stored in the memory employed in the WWW server 2 and is executed by the processing unit of WWW server 2. WWW server program 25 transmits contents to the client 1 in accordance with a request made by the client 1. In addition, the WWW server program 25 stores authentication information in the access control table 28 for each request for contents and authenticates data received from the client 1, which is relevant to the contents.

It should be noted that the WWW server program 25 includes an electronic authentication function according to the present invention. WWW server program 25 is stored in a storage medium and then transferred to the memory employed in the WWW server 2 through a drive unit also employed in the WWW server 2 for execution by the processing unit of the WWW server 2. As an alternative, the WWW server program 25 is received by the WWW server 2 from the network and then stored into the memory of the WWW server 2 to be executed by the processing unit employed in the WWW server 2. The WWW browser program 16 includes an electronic authentication function according to the present invention. The WWW browser program 16 is stored in a storage medium and then transferred to the memory employed in the client 1 through a drive unit also employed in the client 1 for execution by the processing unit of the client 1. As an alternative, the WWW browser program 16 is received by the client 1 from the network and then stored into the memory of the client 1 to be executed by the processing unit employed in the client 1.

Figure 2:
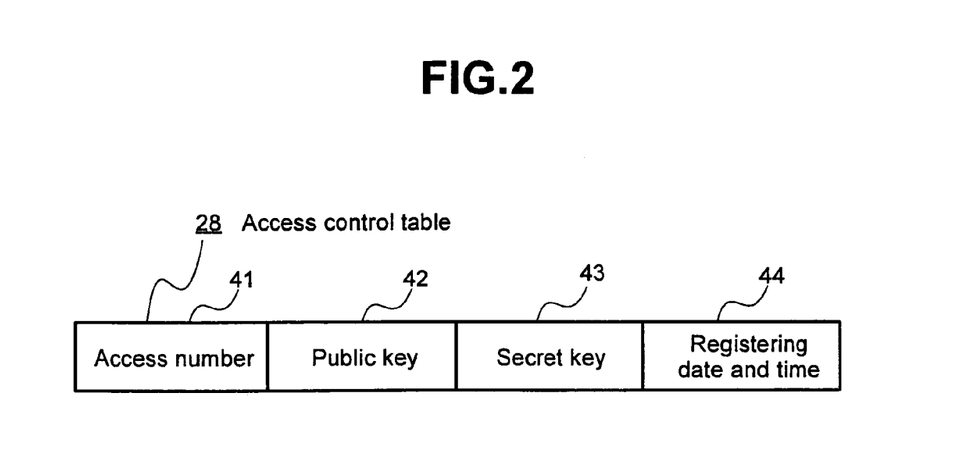
FIG. 2 illustrates a diagram showing the data format of an access information record stored in an access control table 28 according to a particular embodiment of the present invention.

FIG. 2 is a diagram showing the data format of each access information record stored in the access control table 28. As shown in the figure, the record comprises an access number 41, a public key 42, a private key 43 and a cataloging date and time 44. The access number 41 is created for each access to contents and associated with the access to the contents. The public key 42 is an encryption key generated for protecting the confidentiality of data received from the client 1. The private key 43 is a decryption key for decrypting an encrypted text obtained as a result of encryption using the public key 42. Much like the access number 41, the public key 42 and the private key 43 are generated for each access to contents.

The cataloging date and time 44 is a date and a time at which the access information record is cataloged in the access control table 28.

Figure 3:
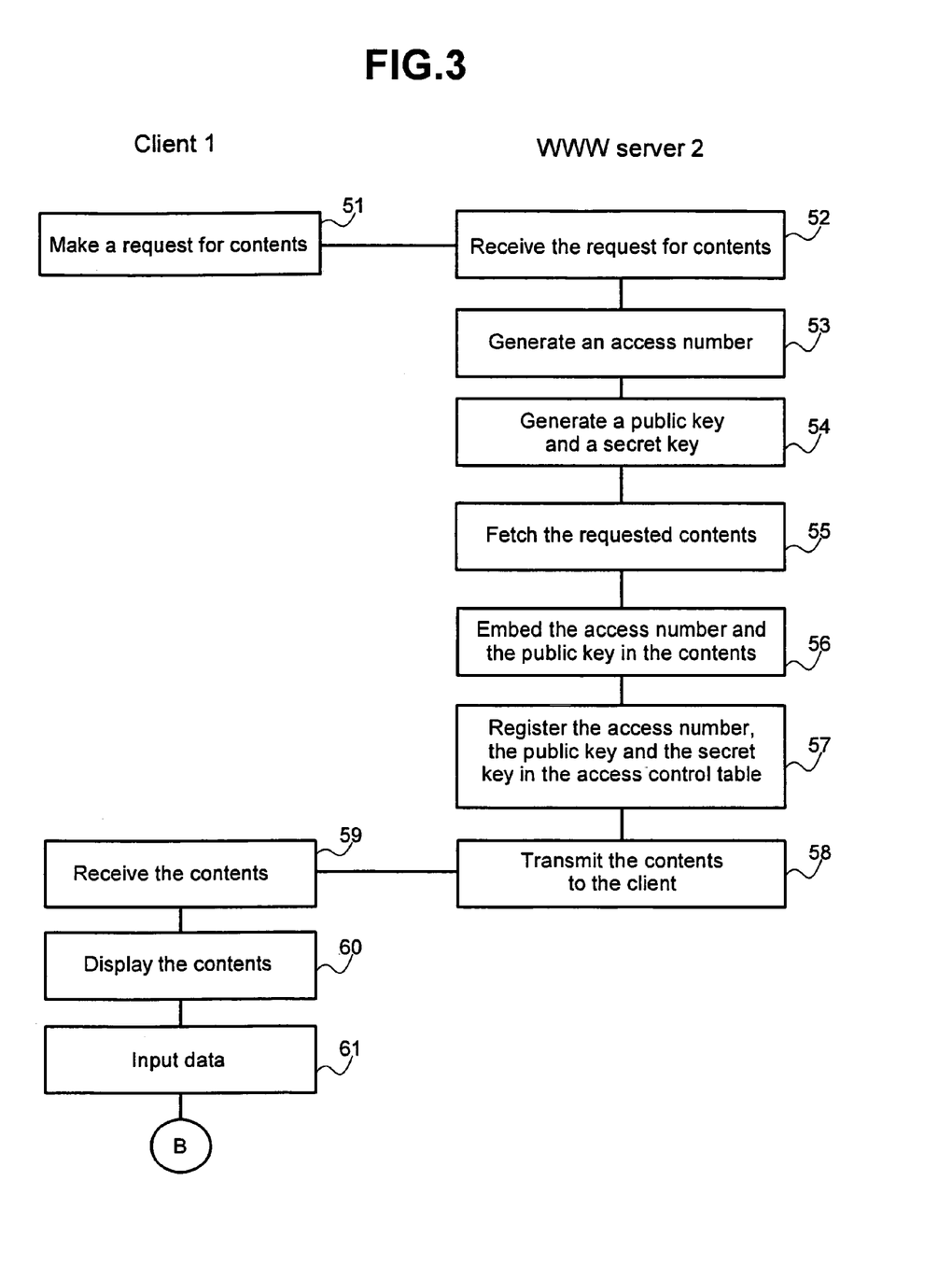
FIG. 3 illustrates a flowchart showing the flow of processing carried out by the system implemented by a particular embodiment of the present invention.
Figure 4:
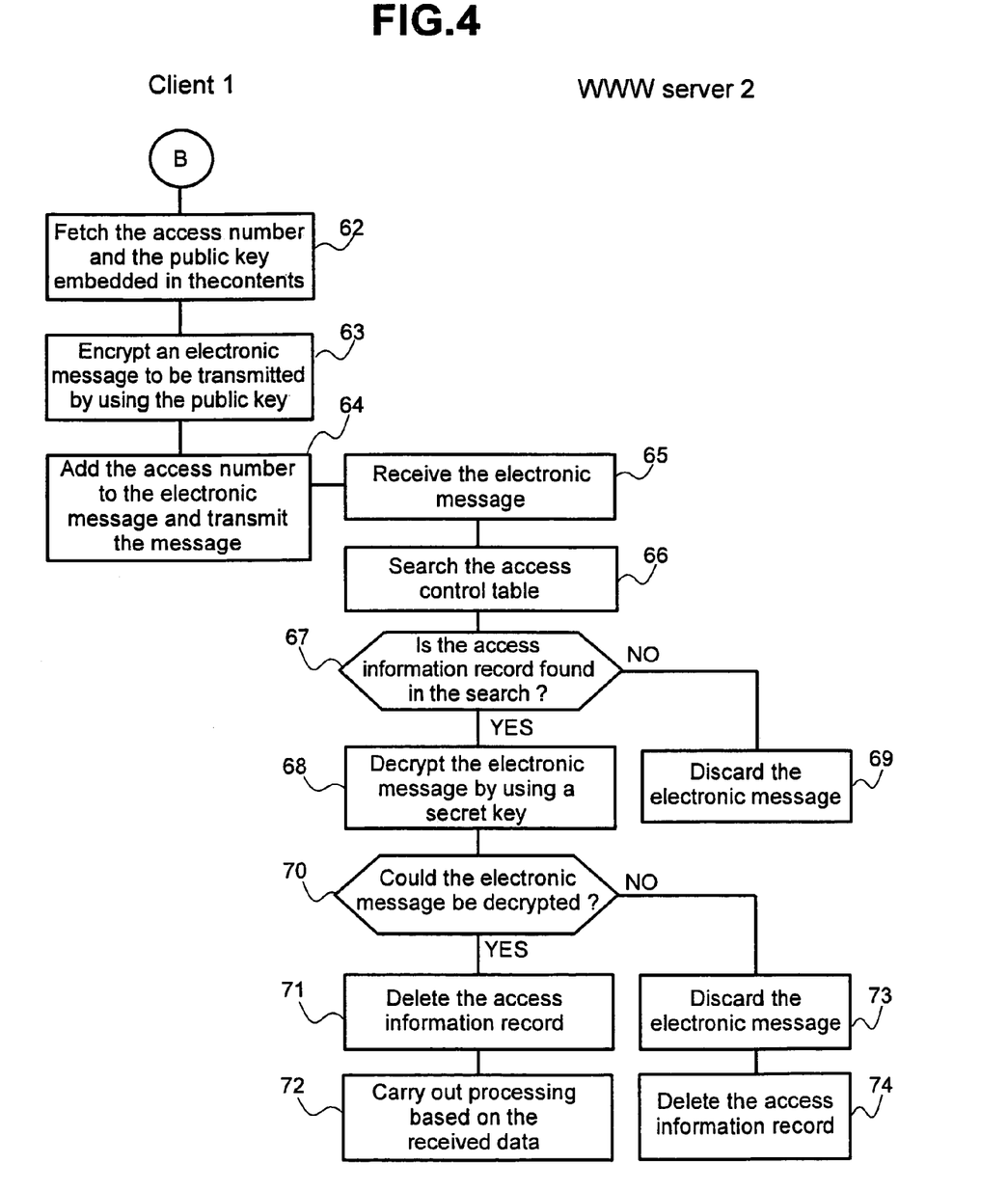
FIG. 4 illustrates a continuation flowchart of the one of FIG. 3 showing the flow of processing carried out by the system implemented by a particular embodiment of the present invention.

FIGS. 3 and 4 illustrate a flowchart showing the flow of processing carried out by execution of the WWW browser program 16 stored in the client 1 and the WWW server program 25 stored in the WWW server 2. As shown in FIG. 3, the flowchart begins with a step 51 at which the WWW browser program 16 transmits a request for contents to the WWW server 2. Then, at a step 52, the WWW server program 25 receives the request for contents. Subsequently, at a step 53, a random number is generated to be used as an access number. Then, at a step 54, a public key and a corresponding private key are generated in accordance with a public key encryption system. Subsequently, at a step 55, the content DB 29 is searched for the requested contents. Then, at a step 56, the access number generated at the step 53 and the public key generated at the step 54 are embedded in the contents by using a digital watermark technology for making the key invisible to the user. As a position of the contents at which these pieces of information are embedded, it is desirable to provide a rectangular area including a specific mark such as an Internet mark or a logo mark in order to make positioning convenient. In addition, it is desirable to embed the information in a concentrated picture area in order to make the digital watermark technology easy to apply. Subsequently, at a step 57, the access number 41 generated at the step 53, the public key 42 and the private key 43 generated at the step 54 and an additional cataloging date and time 44 are cataloged in the access control table 28 as a new access information record. Then, at a step 58, the contents including the authentication information embedded therein as described above are transmitted to the client 1.

Subsequently, the WWW browser program 16 receives the contents at a step 59 and displays them on the display unit 11 at a step 60. While the displayed contents are visible to the user, the access number and the public key embedded in the contents are not displayed so that the user is not capable of recognizing the number and the key visually. As a representative example of contents, the contents can include image information of items in a catalogue for an electronic commerce application, from which a user can select a favorite item.

Then, at a step 61, when data such as personal information, typically including an address to which a product is to be delivered is entered via the input unit 12, the flow of the processing continues as illustrated by the flowchart shown in FIG. 4. As shown in the figure, the flowchart begins with a step 62 at which the WWW browser program 16 identifies the position of the embedded digital watermark on the contents and fetches the embedded access number and the embedded public key. Then, at a step 63, the input data is encrypted by using the public key to create an electronic message. Subsequently, at a step 64, the access number is added to the electronic message which is then transmitted to the WWW server 2 along with the access number. Even though the access number can also be encrypted, such encryption is not required since its degree of confidentiality is low.

Subsequently, the WWW server program 25 receives this electronic message at a step 65 and searches the access control table 28 for a record indicated by the access number included in the electronic message at a step 66. Then, the result of the search is examined at a step 67 and, if the outcome of the examination carried out at the step 67 is YES, indicating that the access information record was found, the server program authenticates the legitimacy of access, and the processing continues at a step 68. At step 68, an encrypted portion of the electronic message is decrypted by using the private key. Otherwise, if the outcome of the examination carried out at the step 67 is NO, indicating that the access information record was not found, the processing continues at a step 69, at which the received electronic message is discarded. From the step 68, the flow of the processing proceeds to a step 70 to form a judgment as to whether or not the encrypted portion of the electronic message could be decrypted into data with a meaning expected in advance. If the outcome of the judgment formed at the step 70 is YES, indicating that the encrypted portion could be decrypted, the processing continues to a step 71, at which the access information record is deleted from the access control table 28. Then, at a step 72, subsequent processing is carried out on the basis of the input data. In the case of electronic commerce applications, the inputted selection information can be transmitted to an Internet site where the item can be processed. Otherwise, if the outcome of the judgment formed at the step 70 is NO, indicating that the encrypted portion could not be decrypted, the flow of the processing continues to a step 73, at which the received electronic message is discarded. Then, at the step 74, the access information record is deleted from the access control table 28. Subsequent processing is not carried out. Generally, the deleting of the access information record means that the record is invalidated. In this example, access information is deleted from access control table 28. Alternatively, access number 41, its corresponding public key 42, secret key 43, and registering date and time 44, may have an effective flag, which can be set and reset according to whether the access information record is valid or invalid.

It is also worth noting that the WWW server 2 periodically checks the cataloging date and time 44 of each access information record cataloged in the access control table 28. In the event of a time-out where time of a predetermined length has lapsed since the time indicated by the cataloging date and time 44, the access information record is deleted from the access control table 28. In the case of a time-out, authentication of an access to contents accompanied by no response expressed by input data is halted. When access is not permitted, the display of client 1 can show that access has been denied because of an illegal access attempt. Such a display can provide to users an indication of a reason that access has been denied.

According to a specific embodiment described above, contents transmitted to the client 1 include an embedded access number which is generated for each access to contents. Thus, even if the contents are copied and data entered in response to the contents is transmitted to the WWW server 2, the access number will have already been invalidated by the WWW server 2, so that the data transmitted to the WWW server 2 will also be invalid. In addition, even if an access number is illegally intercepted in the course of the transmission of an electronic message from the client 1 to the WWW server 2 by way of the Internet 3, the access number will be invalidated in an attempt to reuse the number. In addition, even if the user of the client 1 is capable of decoding an access number embedded in contents, the number can not be reused for other purposes anyway.

In addition, according to a specific embodiment described above, a public key that can be used only once is embedded in contents transmitted to the client 1 to protect the confidentiality of data such as personal information transmitted from the client 1 to the WWW server 2. Thus, even if information encrypted by using the public key is illegally intercepted, it will be impossible to reuse the information. As a result, an unauthorized user is not capable of illegally intercepting personal information of another user in order to pretend to be the other user. It is also possible to avoid a wrongdoing such as falsification of information such as the amount of money or the quantity of products described on an order sheet.

As described above, the digital watermark technology is adopted in a specific embodiment. The adoption of the digital watermark technology can serve to conceal an access number and a public key by using a digital watermark technology since an access number and a public key are not substantive contents and, hence, do not have to be revealed to the user. Thus, there is especially no confidentiality in the digital watermark technology itself. Therefore, the digital watermark system can be widely applied to a large number of content packages. It is desirable to provide a system for embedding a watermark in a simple and reliable way so that the system can be applied as a common system to the WWW browser program 16 and the WWW server program 25.

In addition, in the embodiment described above, an access number is generated by the WWW server 2 as a random number. It should be noted, however, that an access number can also be generated as a serial number or a consecutive number so that the access number can be used for other purposes such as protection of the copyright of contents. If an access number is generated as a consecutive number, however, there is danger of an access number's being predicted in next generation of future contents on the basis of a result of decoding an access number embedded in present contents. As another alternative, a hash value is found from a number of digits in an access number by using a hash function, and the hash value of the access number is embedded in contents. In this case, the hash value is cataloged in the field for the access number 41 in an access information record and, at the step 66, the access control table 28 is searched for an access information record indicated by a hash number.

As described above, in a specific embodiment, response data is encrypted by using a public key which is generated along with an identifier of contents so as to prevent the response data from being intercepted illegally.

When personal information, transaction data and the like are transmitted from the client 1 to the WWW server 2 in response to contents transmitted from the WWW server 2 to the client 1 in a transaction such as Internet shopping or an electronic business transaction using the Internet, the present invention allows the personal information, the transaction data and the like to be verified as input data for a legal access to the contents. In addition, the present invention is also capable of preventing double transaction data from being transmitted by issuing two or more orders for one order form by user's mistake.

As described above, according to the present invention, a content identifier appended to contents transmitted by a server to a client accompanies data transmitted by the client to the server in response to the contents. Thus, transmission of data in response to contents in an access to the contents can be limited to one-time transmission to exclude disallowed response data using a copy of the contents and illegal response data intended to falsify information. As a result, the present invention is capable of proving that input data is correct data transmitted as a response to contents in an access to the contents. Although the above has generally described the present invention according to specific systems, the present invention has a much broader range of applicability.

The specific embodiments described herein are intended to be merely illustrative and not limiting of the many embodiments, variations, modifications, and alternatives achievable by one of ordinary skill in the art. Further, the diagrams used herein are merely illustrations and should not limit the scope of the claims herein. One of ordinary skill in the art would recognize other variations, modifications, and alternatives. Thus, it is intended that the foregoing description be given the broadest possible construction and be limited only by the following claims.

The preceding has been a description of the preferred embodiment of the invention. It will be appreciated that deviations and modifications can be made without departing from the scope of the invention, which is defined by the appended claims.

What is claimed is:

1. An electronic authentication method comprising:
   in a first information processing apparatus, receiving a request for contents from a second information processing apparatus;
   in response to said request, generating an encryption key and an access number that are associated with said requested contents;
   producing enhanced content comprising said requested contents, said encryption key, and said access number:
   transmitting said enhanced content to said second information processing apparatus;
   presenting said enhanced content to a user at said second information processing apparatus, said encryption key and said access number are visually imperceptible to a user;
   in said second information processing apparatus, accessing said encryption key and said access number from said enhanced content;
   receiving data in said second information processing apparatus and in response thereto producing input data from said received data that includes the transmitted access number, wherein at least some of said input data is encrypted with said encryption key; and
   transmitting said input data from said second information apparatus to said first information apparatus as received input data,
   wherein said first information processing apparatus can authenticate legitimacy of said received input data based on said access number.

2. An electronic authentication method according to claim 1, wherein: said embedded encryption key is a public key; said received input data is decrypted using a private key associated with said public key; and said public key and said private key are generated in said first information processing apparatus.

3. An information processing method comprising:
   generating an encryption key and an access number that are associated with contents;
   creating an access information record corresponding to said encryption key and said access number;

incorporating said encryption key and said access number into said contents to produce enhanced contents, said encryption key and said access number are visually imperceptible to a user;

transmitting said enhanced contents to an external apparatus;

receiving received data from said external apparatus, said received data including said access number, at least a portion of said received data being encrypted with said encryption key;

decrypting said received data; and deleting said access information record based on whether said received data could be decrypted and based on a comparison with said access number and said received data including said access number.

4. An electronic authentication system comprising a first information processing apparatus and a second information processing apparatus wherein:

said first information processing apparatus comprises:
- a means for generating an encryption key and an access number associated with first contents;
- a storage means for storing a record that corresponds to said encryption key and said access number;
- a means for transmitting enhanced contents to said second information processing apparatus, said enhanced contents comprising said first contents, said encryption key, and said access number, said encryption key and said access number are visually imperceptible to a user;

said second information processing apparatus comprises:
- a means for inputting the received data, including means for displaying received enhanced contents;
- a means for transmitting said received data to said first information processing apparatus as input data, wherein said input data is generated by encrypting said data and includes said access number; and there is further provided in said first information processing apparatus a processing means for authenticating legitimacy of said input data received by said first information processing apparatus and deleting said record based at least on a comparison of said stored access number and said access number contained in said received input data.

5. An electronic authentication system according to claim 4, wherein said second information processing apparatus further comprises an acquirement means for acquiring said encryption key and said access number from said received enhanced contents.

6. An electronic authentication system according to claim 4, wherein said second portion of said identifier is an encryption key; and said first information processing apparatus further comprises a reception means for receiving an identifier encrypted by using said encryption key and decrypting said encrypted identifier.

7. An information processing apparatus comprising:
- a generation means for generating an identifier for contents, said identifier comprising and encryption key and an access number;
- a storage means for storing at least said first part of said identifier as a stored identifier;
- a transmission means for transmitting enhanced content comprising said contents and said identifier to an external apparatus, said encryption key and said access number are visually imperceptible to a user:

- a reception means for receiving received data from said external apparatus, said received data comprising a access number and a portion that has been encrypted using said encryption key;
- an acquirement means for acquiring said access number from said received data; and
- a processing means for deleting said stored identifier if said access number matches said stored access number.

8. An information processing apparatus according to claim 7, wherein there is further provided a reception means for decrypting said portion of said received data that has been encrypted.

9. An information processing apparatus comprising:
- a contents requesting means for requesting an external information processing apparatus to transmit contents;
- a reception means for receiving said requested contents, an identifier comprising an encryption key and an access number being embedded in said requested contents;
- a display means for displaying said requested contents to a user, said encryption key and said access number are visually imperceptible to a user;
- an extraction means for extracting said identifier from said requested contents;
- an input means for inputting said access number; and
- a transmission means for transmitting, as secured data, said access number to said external information processing apparatus, at least of portion of said secured data being encrypted by said encryption key; and
- means for said external information processing apparatus to authenticate legitimacy of said received access number.

10. A storage medium for storing information readable by a computer, said medium characterized in that said information includes:
- a generation function for generating an encryption key and an access number for first contents;
- a storage function for storing a stored identifier corresponding to said encryption key and said access number;
- a transmission function for transmitting said contents, said identifier, and said access number to an external apparatus as enhanced content, said encryption key and said access number are visually imperceptible to a user;
- a reception function for receiving received data from said external apparatus, said received data comprising said access number and a portion that is encrypted using said encryption key;
- an acquirement function for acquiring said access number from said received data; and
- a processing function for authenticating legitimacy of said received data and invalidating said stored identifier if said received access number matches stored access number.

11. A storage medium for storing information readable by a computer according to claim 10, wherein said information further includes a function for decrypting said received data.

12. A storage medium for storing information readable by a computer, said medium characterized in that said information includes:
- a contents requesting function for requesting an external information processing apparatus to transmit contents;
- a reception function for receiving said requested contents, an identifier being embedded in said contents, said identifier comprising an encryption key and an access number;

a display function for displaying said requested contents to a user said encryption key and said access number are visually imperceptible to a user;

an extraction function for extracting said identifier from said contents;

an input function for inputting said access number; and a transmission function for transmitting, as input data, said access number to said external information processing apparatus, a portion of said input data being encrypted using said encryption key; and said external information processing apparatus authenticates the legitimacy of said received access number.

13. A storage medium for storing information readable by a computer according to claim 12, wherein said medium characterized in that said information further includes a function for encrypting said user data by using said encryption key.

14. An electronic authentication method comprising:

generating an identifier for contents in a first information processing apparatus, said identifier comprising an encryption key and an access number;

driving said first information processing apparatus to store at least a first portion of said identifier and the present time as a storage time in a storage unit;

transmitting said contents and said identifier to a second information processing apparatus as enhanced content, wherein said identifier is embedded in said contents;

presenting said enhanced content to a user at said second information processing apparatus, said encryption key and said access number are visually imperceptible to a user;

inputting said access number in said second information processing apparatus;

transmitting, as secured data, said access number contained in said enhanced content from said second information processing apparatus to said first information processing apparatus, a portion of said secured data encrypted by said encryption key contained in said enhanced content; and invalidating said first portion of said identifier stored in said storage unit if said identifier received by said first information processing apparatus is not stored in said storage unit or a time of a predetermined length has lapsed since said storage time stored in said storage unit.

15. An electronic authentication method, comprising:

generating an encryption key and an access number that are associated with contents in a first information processing apparatus;

embedding said encryption key and said access number into said contents to produce enhanced content, said encryption key and said access number are visually imperceptible to a user;

transmitting said enhanced content to a second information processing apparatus;

displaying said enhanced content in said second information processing apparatus;

inputting said access number in said second information processing apparatus;

obtaining said access number from said enhanced data;

encrypting said access number using said encryption key to produce secured input data, including acquiring said encryption key from said enhanced content;

transmitting said secured input data and said access number from said second information processing apparatus to said first information processing apparatus; and validating said secured input data based on said access number and by decrypting said secured input data with a decryption key.

16. An authentication method in a system in which a first computer making a request for a service is connected to a second computer rendering services via a network, requested contents being transmitted from the second computer to the first computer, data being transmitted from the first computer to the second computer associated with the contents, said method comprising:

generating at the second computer an encryption key relating to the contents;

generating at the second computer an access number for accessing the contents and cataloging the access number in a storage unit;

embedding the encryption key and the access number in the contents to produce enhanced content, said encryption key and said access number are visually imperceptible to a user, and transmitting the enhanced content to the first computer;

displaying the contents at the first computer;

generating secured data at the first computer by processing the access number fetched from the enhanced content and transmitting the secured data to the second computer, some of the secured data being encrypted with the encryption key fetched from the enhanced content; and at the second computer authenticating validity of the secured data based on the access number in the secured data and by decrypting the secured data with a decryption key.

17. An authentication method according to claim 16, wherein the encryption key is a public key and the decryption key is a private key.

* * * * *